United States Patent
Leaney et al.

[11] Patent Number: 5,898,053
[45] Date of Patent: Apr. 27, 1999

[54] POLYMERISATION PROCESS

[75] Inventors: Patrick Leaney, Bouc Bel Air; Frederick Morterol, Sausset-les-Pins, both of France

[73] Assignee: BP Chemicals Limited, London, United Kingdom

[21] Appl. No.: 08/907,871

[22] Filed: Aug. 11, 1997

[30] Foreign Application Priority Data

Aug. 13, 1996 [EP] European Pat. Off. .............. 96430010

[51] Int. Cl.⁶ .................................................... C08F 2/34
[52] U.S. Cl. ........................... 526/68; 526/67; 526/69; 526/70; 526/88; 526/901
[58] Field of Search .................. 526/67, 68, 69, 526/70, 901, 88

[56] References Cited

U.S. PATENT DOCUMENTS

| | | |
|---|---|---|
| 5,436,304 | 7/1995 | Griffin et al. . |
| 5,541,270 | 7/1996 | Chinh et al. ............................... 526/68 |
| 5,668,228 | 9/1997 | Chinh et al. ............................... 526/67 |

FOREIGN PATENT DOCUMENTS

| | | |
|---|---|---|
| 0 089 691 | 9/1983 | European Pat. Off. . |
| 0 173 261 | 3/1986 | European Pat. Off. . |
| 0 351 068 | 1/1990 | European Pat. Off. . |
| 0 360 094 | 3/1990 | European Pat. Off. . |
| 0 381 364 | 8/1990 | European Pat. Off. . |
| 94/25495 | 11/1994 | WIPO . |
| 94/28032 | 12/1994 | WIPO . |

*Primary Examiner*—David W. Wu
*Attorney, Agent, or Firm*—Finnegan, Henderson, Farabow, Garrett & Dunner, L.L.P.

[57] ABSTRACT

The present invention provides a continuous gas fluidised bed process for the polymerisation of olefin monomer selected from (a) ethylene, (b) propylene, (c) mixtures of ethylene and propylene, and (d) one or more other alpha-olefins mixed with (a), (b) or (c), to produce a polymer in a fluidised bed reactor which process comprises:

(a) continuously withdrawing from the reactor a gaseous stream comprising unreacted olefin monomer and having entrained therein catalyst and/or polymer particles;

(b) continuously recycling said gaseous stream comprising unreacted olefin monomer through a fluidised bed in said reactor in the presence of a polymerisation catalyst under reactive conditions;

(c) cooling by means of heat exchanger(s) at least part of said gaseous stream withdrawn from said reactor to a temperature at which liquid condenses out;

(d) separating at least part of the condensed liquid from the gaseous stream; and (e) introducing at least part of the separated liquid directly into the fluidised bed, characterised in that at least part of the separated liquid is reintroduced into the recycle gaseous stream before said heat exchange(s).

3 Claims, 3 Drawing Sheets

POLYMERISATION PROCESS

The present invention relates to a continuous process for the gas-phase polymerisation of olefins in a fluidised bed reactor.

BACKGROUND OF THE INVENTION

Processes for the homopolymerisation and copolymerisation of olefins in the gas phase are well known in the art. Such processes can be conducted for example by introducing the gaseous monomer into a stirred and/or fluidised bed comprising polyolefin and a catalyst for the polymerisation.

In the fluidised bed polymerisation of olefins, the polymerisation is conducted in a fluidised bed reactor wherein a bed of polymer particles is maintained in a fluidised state by means of an ascending gas stream comprising the gaseous reaction monomer. The start-up of such a polymerisation generally employs a bed of polymer particles similar to the polymer which it is desired to manufacture. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. The fluidised bed comprises a bed of growing polymer particles. This bed is maintained in a fluidised condition by the continuous upward flow from the base of the reactor of a fluidising gas.

The polymerisation of olefins is an exothermic reaction and it is therefore necessary to provide means to cool the bed to remove the heat of polymerisation. In the absence of such cooling the bed would increase in temperature and, for example, the catalyst becomes inactive or the bed commences to fuse. In the fluidised bed polymerisation of olefins, the preferred method for removing the heat of polymerisation is by supplying to the polymerisation reactor a gas, the fluidising gas, which is at a temperature lower than the desired polymerisation temperature, passing the gas through the fluidised bed to conduct away the heat of polymerisation, removing the gas from the reactor and cooling it by passage through an external heat exchanger, and recycling it to the bed. The temperature of the recycle gas can be adjusted in the heat exchanger to maintain the fluidised bed at the desired polymerisation temperature. In this method of polymerising alpha olefins, the recycle gas generally comprises the monomeric olefin, optionally together with, for example, an inert diluent gas such as nitrogen or a gaseous chain transfer agent such as hydrogen. Thus, the recycle gas serves to supply the monomer to the bed, to fluidise the bed, and to maintain the bed at the desired temperature. Monomers consumed by the polymerisation reaction are normally replaced by adding make up gas to the recycle gas stream.

It is well known that the production rate (i.e. the space time yield in terms of weight of polymer produced per unit volume of reactor space per unit time) in commercial gas fluidised bed reactors of the aforementioned type is restricted by the maximum rate at which heat can be removed from the reactor. The rate of heat removal can be increased for example, by increasing the velocity of the recycle gas and/or reducing the temperature of the recycle gas and/or changing the heat capacity of the recycle gas. However, there is a limit to the velocity of the recycle gas which can be used in commercial practice. Beyond this limit the bed can become unstable or even lift out of the reactor in the gas stream, leading to blockage of the recycle line and damage to the recycle gas compressor or blower. There is also a limit on the extent to which the recycle gas can be cooled in practice. This is primarily determined by economic considerations, and in practise is normally determined by the temperature of the industrial cooling water available on site. Refrigeration can be employed if desired, but this adds to the production costs.

The prior art suggests a number of methods for increasing the heat removal capacity of the recycle stream, for example, by introducing a volatile liquid.

EP 89691 relates to a process for increasing the space time yield in continuous gas fluidised bed processes for the polymerisation of fluid monomers, the process comprising cooling part or all of the unreacted fluids to form a two phase mixture of gas and entrained liquid below the dew point and reintroducing said two phase mixture into the reactor. The specification of EP 89691 states that a primary limitation on the extent to which the recycle gas stream can be cooled below the dew point is in the requirement that the gas-to-liquid ratio be maintained at a level sufficient to keep the liquid phase of the two phase fluid mixture in an entrained or suspended condition until the liquid is vaporised, and further states that the quantity of liquid in the gas phase should not exceed about 20 weight percent, and preferably should not exceed about 10 weight percent, provided always that the velocity of the two phase recycle stream is high enough to keep the liquid phase in suspension in the gas and to support the fluidised bed within the reactor. EP 89691 further discloses that it is possible to form a two-phase fluid stream within the reactor at the point of injection by separately injecting gas and liquid under conditions which will produce a two phase stream, but that there is little advantage seen in operating in this fashion due to the added and unnecessary burden and cost of separating the gas and liquid phases after cooling.

EP 173261 relates to a particular means for introducing a recycle stream into fluidised bed reactors and, in particular, to a means for introducing a recycle stream comprising a two phase mixture of gas and entrained liquid as described in EP 89691 (supra).

WO 94/25495 describes a fluidised bed polymerisation process comprising passing a gaseous stream comprising monomer through a fluidised bed reactor in the presence of a catalyst under reactive conditions to produce polymeric product and a stream comprising unreacted monomer gases, compressing and cooling said stream, mixing said stream with feed components and returning a gas and liquid phase to said reactor, a method of determining stable operating conditions which comprises: (a) observing fluidised bulk density changes in the reactor associated with changes in the composition of the fluidising medium; and (b) increasing the cooling capacity of the recycle stream by changing the composition without exceeding the level at which a reduction in the fluidised bulk density or a parameter indicative thereof becomes irreversible.

U.S. Pat. No. 5,436,304 relates to a process for polymerising alpha-olefin(s) in a gas phase reactor having a fluidised bed and a fluidising medium wherein the fluidising medium serves to control the cooling capacity of the reactor and wherein the bulk density function (Z) is maintained at a value equal to or greater than the calculated limit of the bulk density function.

WO 94/28032, which is incorporated herein by reference, relates to a process in which the recycle gas stream is cooled to a temperature sufficient to form a liquid and a gas. By separating the liquid from the gas and then feeding the liquid directly to the fluidised bed, the total amount of liquid which may be reintroduced into the fluidised bed polymerisation reactor for the purpose of cooling the bed by evaporation of the liquid can be increased thereby enhancing the level of cooling to achieve higher levels of productivity. The recycle gas stream heaving the top of the reactor contains catalyst and polymer particles (fines) which can be partially removed by means of a gas cyclone. The recycle gas stream is suitably cooled by means of heat exchanger(s). It has been observed that fouling of said heat exchanger(s) is encountered due to the presence of fines in the recycle gas stream. This fouling is detrimental to the operability of the heat exchanger(s) which have to be cleaned from time to time; this cleaning procedure may even require the continuous process to be interrupted.

SUMMARY OF THE INVENTION

There has now been found an improved process wherein the heat exchanger(s) can be continuously, efficiently and advantageously cleaned from the fines. There has further been found that the use of a gas cyclone separator in the recycle stream can be eliminated when using the present improved process, thereby achieving an improved process optimisation and reduced costs.

Thus, according to the present invention there is provided a continuous gas fluidised bed process for the polymerisation of olefin monomer selected from (a) ethylene, (b) propylene, (c) mixtures of ethylene and propylene, and (d) one or more other alpha-olefins mixed with (a), (b) or (c), to produce a polymer in a fluidised bed reactor which process comprises:

(0) continuously withdrawing from the reactor a gaseous stream comprising unreacted olefin monomer and having entrained therein catalyst and/or polymer particles;

(1) continuously recycling said gaseous stream comprising unreacted olefin monomer through a fluidised bed in said reactor in the presence of a polymerisation catalyst under reactive conditions;

(2) cooling by means of heat exchanger(s) at least part of said gaseous stream withdrawn from said reactor to a temperature at which liquid condenses out;

(3) separating at least part of the condensed liquid from the gaseous stream; and (4) introducing at least part of the separated liquid directly into the fluidised bed, characterised in that at least part of the separated liquid is reintroduced into the recycle gaseous stream before said heat exchanger(s).

The gaseous recycle stream withdrawn from the reactor comprises unreacted gaseous monomers, and optionally, inert hydrocarbons, inert gases such as nitrogen, reaction activators or moderators such as hydrogen, as well as entrained catalyst and/or polymer particles (hereinafter referred to as "fines").

The recycled gaseous stream fed to the reactor additionally comprises sufficient make-up monomers to replace those monomers polymerised in the reactor.

DETAILED DESCRIPTION OF THE INVENTION

Figure 1:
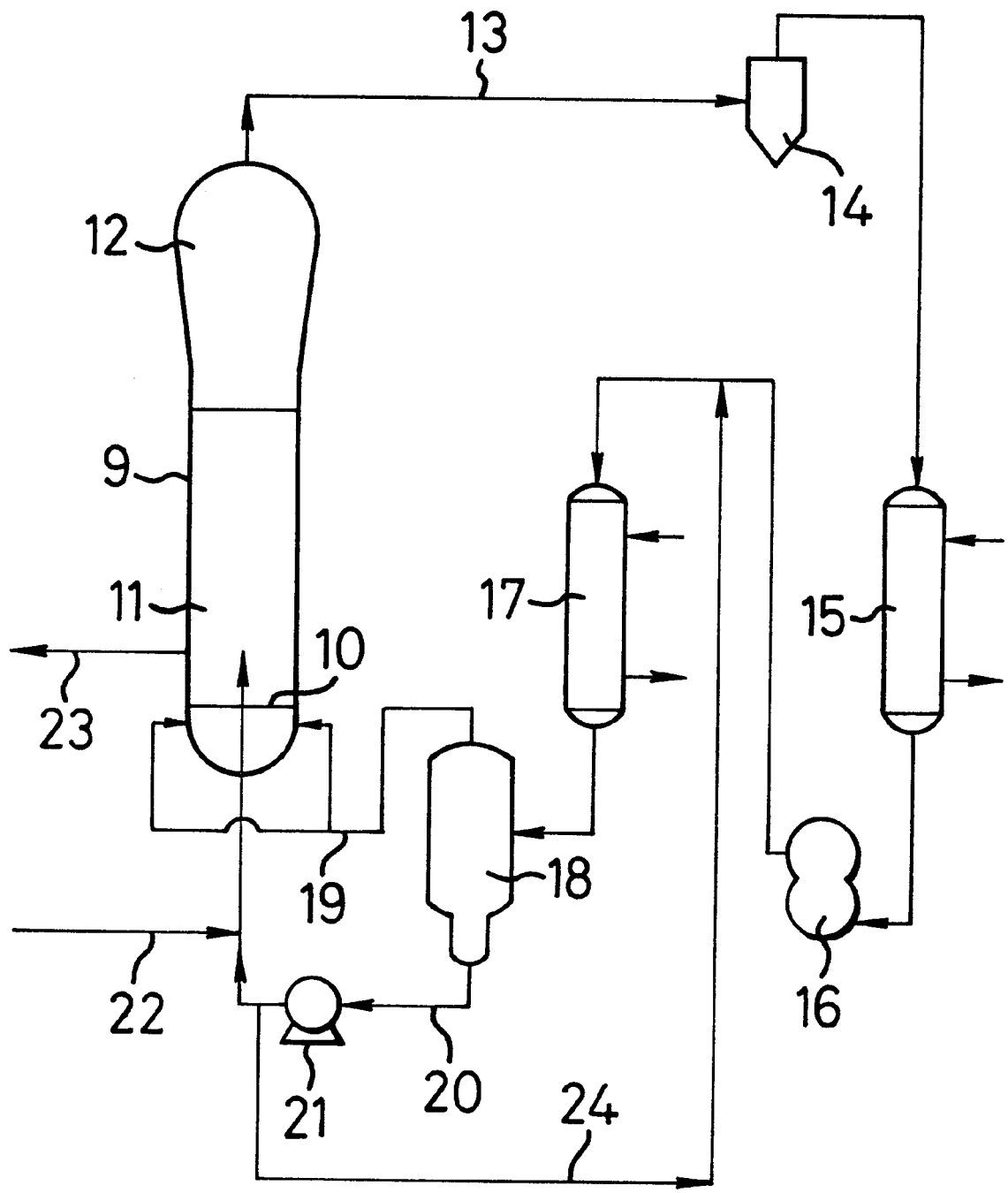
FIG. 1 shows diagrammatically a gas-phase fluidized bed reactor suitable for use with the polymerization process of the invention.

The process according to the present invention is suitable for the manufacture of polyolefins in the gas phase by the polymerisation of one or more olefins at least one of which is ethylene or propylene. Preferred alpha-olefins used in combination with ethylene and/or propylene in the process of the present invention are those having from 4 to 8 carbon atoms. However, small quantities of alpha olefins having more than 8 carbon atoms, for example 9 to 18 carbon atoms (e.g. a conjugated diene), can be employed if desired. Thus it is possible to produce homopolymers of ethylene or propylene or copolymers of ethylene and/or propylene with one or more $C_4$–$C_8$ alpha-olefins. The preferred alpha-olefins are but-1-ene, pent-1-ene, hex-1-ene, 4-methylpent-1-ene, oct-1-ene and butadiene. Examples of higher olefins that can be copolymerised with the primary ethylene and/or propylene monomer, or as partial replacement for the $C_4$–$C_8$ monomer are dec-1-ene and ethylidene norbornene.

When the process is used for the copolymerisation of ethylene or propylene with alpha-olefins the ethylene or propylene is present as the major component of the monomers, and preferably is present in an amount of at least 70%, more preferably at least 80% of the total monomers/comonomers.

The process according to the present invention may be used to prepare a wide variety of polymer products for example linear low density polyethylene (LLDPE) based on copolymers of ethylene with but-1-ene, 4-methylpent-1-ene or hex-1-ene and high density polyethylene (HDPE) which can be for example, homopolyethylene or copolymers of ethylene with a small portion of higher alpha olefin, for example, but-1-ene, pent-1-ene, hex-1-ene or 4-methylpent-1-ene.

The liquid which condenses Out of the recycle gaseous stream can be a condensable monomer, e.g. but-1-ene, hex-1-ene or octene used as a comonomer for the production of LLDPE or may be an inert condensable liquid, e.g. inert hydrocarbon(s), such as $C_4$–$C_8$ alklane(s) or cycloalkane(s), particularly butane, pentane or hexane.

It is important that the liquid should vaporise within the bed under the polymerisation conditions being employed so that the desired cooling effect is obtained and to avoid substantial accumulation of liquid within the bed.

The process is particularly suitable for polymerising olefins at an absolute pressure of between 0.5 and 6 MPa and at a temperature of between 30° C. and 130° C. For example for LLDPE production the temperature is suitably in the range 75–90° C. and for HDPE the temperature is typically 80–105° C. depending on the activity of the catalyst used.

The polymerisation reaction may be carried out in the presence of a catalyst system of the Ziegler-Natta type, consisting of a solid catalyst essentially comprising a compound of a transition metal and of a cocatalyst comprising an organic compound of a metal (i.e. an organometallic compound, for example an alkylaluminium compound). High-activity catalyst systems have already been known for a number of years and are capable of producing large quantities of polymer in a relatively short time, and thus make it possible to avoid a step of removing catalyst residues from the polymer. These high-activity catalyst systems generally comprise a solid catalyst consisting essentially of atoms of transition metal, of magnesium and of halogen. The process is also suitable for use with metallocene catalysts and Ziegler catalysts supported on silica. It is also possible to use a high-activity catalyst consisting essentially of a chromium oxide activated by a heat treatment and associated with a granular support based on a refractory oxide.

The catalyst may suitably be employed in the form of a prepolymer powder prepared beforehand during a prepolymerisation stage with the aid of a catalyst as described above. The prepolymerisation may be carried out by any suitable process, for example, polymerisation in a liquid hydrocarbon diluent or in the gas phase using a batch process, a semi-continuous process or a continuous process.

Preferably, substantially the whole of the gaseous recycle stream withdrawn from the reactor is cooled and separated.

In a preferred embodiment according to the present invention, the recycle gaseous stream is cooled to a temperature at which liquid condenses out and the gaseous stream is reintroduced into the reactor below the bed, for example, below the fluidisation grid if such a grid is employed. Part of the separated liquid is introduced directly in the fluidised bed, preferably at or above the point at which the gaseous stream passing through the fluidised bed has substantially reached the temperature of the gaseous stream being withdrawn from the reactor, while the remaining part of the separated liquid is reintroduced into the recycle gaseous stream before the heat exchanger(s).

The recycle gaseous stream is cooled by means of heat exchanger(s) to a temperature such that liquid is condensed in the gaseous stream. Suitable heat exchangers are well known in the art. According to the present invention it is now possible to keep clean the heat exchanger(s) when at least part of the separated condensed liquid (coming from step (3) hereabove) is reintroduced in the recycle gaseous stream before introduction in the heat exchanger(s). The liquid present in the recycle gaseous stream prevents the fines from fouling the heat exchanger(s). A preferred embodiment according,, to the present invention presents the characterising feature that the stream passing through the heat exchanger(s) is a mixed gas/liquid stream. The rate at which the condensed liquid is introduced in the recycle gaseous stream before the heat exchanger(s) is such that at least some liquid is present from the inlet to the outlet of said heat exchanger(s). If needed, the separated condensed liquid may be subjected to an additional cooling before its introduction into the heat exchanger(s) in order to ensure this presence of liquid from the inlet to the outlet of the heat exchanger(s). A further advantage of this particular aspect of the present invention is that, by cooling the liquid before introduction into the heat exchanger(s), any tendency for catalyst or (pre)polymer which may be contained in the recycle stream to cause polymerisation in the heat exchanger(s) will be reduced.

As explained before, part of the fines is usually removed from the recycle gaseous stream by means of a gas cyclone. According to the process of the present invention, while a gas cyclone can still be used, it is preferred not to use any gas cyclone. This represents a further advantage of the present invention since the plant required for operating the process is greatly simplified. The Applicants have unexpectedly found that the cleaning power of the present process is sufficient to prevent from fouling the heat exchanger(s) caused by e.g. the fines laying down on the heat exchange surfaces of the heat exchanger(s), even in the absence of any gas cyclone. Preferably, the fines which may remain entrained in the recycle gaseous stream are, after cooling and separating of the liquid from the gas, reintroduced into the fluidised bed together with the separated liquid stream. Preferably, the fines are reintroduced into the fluidised bed suspended in the liquid stream from the gas/liquid separator.

The recycle gas stream may also comprise inert hydrocarbons used for the injection of catalyst, reaction activators or moderators into the reactor.

Make-up monomers for example ethylene to replace monomers consumed by the polymerisation reaction may be added to the recycle gas stream at any suitable location.

Condensable monomers, for example, but-1-ene, hex-1-ene, 4-methylpent-1-ene and octene, which can, for example, be used as comonomers for the production of LLDPE, or inert condensable liquids, for example, pentane, isopentane, butane and hexane, may be introduced as liquids.

Inert condensable liquids, for example, pentane may for example be injected into the recycle gaseous stream between the heat exchanger and the separator. For the preparation of LLDPE, the comonomer, for example, but-1-ene can, if desired, be injected into the recycle gaseous stream before passage to the heat exchanger.

Suitable means for separating the liquid are for example cyclone separators, large vessels which reduce the velocity of the gas stream to effect separation (knock-out drums), demister type gas-liquid separators and liquid scrubbers, for example, venturi scrubbers. Such separators are well known in the art.

The use of a demister type of gas-liquid separator is particularly advantageous in the process of the present invention.

A further advantage of using a demister type of separator is that the pressure drop within the separator can be lower than in other types of separators thereby enhancing the efficiency of the overall process.

A plurality of liquid injection means may be used to introduce the separated liquid and the fines into the fluidised bed. The liquid injection means are arranged such that the local concentration of liquid does not adversely affect the fluidisation of the bed or the quality of the product, and to enable the liquid to disperse rapidly from each liquid injection means and vaporise in the bed to remove the heat of polymerisation from the exothermic reaction. In this way the amount of liquid introduced for cooling purposes may much more closely approach the maximum loading that can be tolerated without disturbing the fluidisation characteristics of the bed and hence offers the opportunity to achieve enhanced levels of reactor productivity.

The liquid and fines can, it desired, be introduced into the fluidised bed using liquid injection means arranged at different heights within the bed. Such a technique can facilitate improved control over comonomer incorporation. Controlled metering of liquid into the fluidised bed provides useful additional control over the temperature profile of the bed and, in the case that the liquid contains comonomer, provides useful control over the comonomer incorporation into the copolymer.

The liquid injection means or plurality of injections means are preferably arranged in the lower part of the region of the fluidised bed at which the, recycle gaseous stream has substantially reached the temperature of the gaseous stream being withdrawn from the reactor. Commercial processes for the gas fluidised bed polymerisation of olefins are generally operated under substantially isothermal, steady state conditions. However, although almost all of the fluidised bed is maintained at the desired substantially isothermal polymerisation temperature, there normally exists a temperature gradient in the region of the bed immediately above the point of introduction of the cooled recycle gaseous stream into the bed. The lower temperature limit of this region wherein the temperature gradient exists is the temperature of the incoming cool recycle Gas stream, and the upper limit is the substantially isothermal bed temperature. In commercial reactors of the type which employ a fluidisation grid, this temperature gradient normally exists in a layer of about 15 to 30 cm (6 to 12 inches) above the grid.

In order to gain the maximum benefit of the cooling of the separated liquid it is preferred that the liquid injection means is arranged in the bed above the region where this temperature gradient exists, i.e. in the part of the bed which has substantially reached the temperature of the gaseous stream leaving the reactor.

The point or points of introduction of the liquid into the fluidised bed may for example be approximately 50–200 cm, preferably 50–70 cm above the fluidisation grid.

In practice, the temperature profile within the fluidised bed may first be determined during polymerisation using, for example, thermocouples located in or on the walls of the reactor. The point or points of introduction of the liquid is/are then arranged to ensure that the liquid enters into the region of the bed at which the returned gas stream has substantially reached the temperature of the gaseous recycle stream being withdrawn from the reactor.

It is important to ensure that the temperature within the fluidised bed is maintained at a level which is below the sintering temperature of the polyolefin constituting the bed.

The gas from the separator is recycled to the bed, normally into the bottom of the reactor. If a fluidisation grid is employed, such recycle is normally to the region below the grid, and the grid facilitates uniform distribution of the gas to fluidise the bed. The use of a fluidisation grid is preferred.

The gas velocity in the fluidised bed must be greater than or equal to that required for fluidisation of the bed. The minimum gas velocity is generally approximately 6 cm/sec but the process of the present invention is preferably carried out using a gas velocity in the range 40 to 100, most preferably 50 to 70 cm/sec.

The catalyst or prepolymer can, if desired, be introduced into the fluidised bed directly with the separated liquid stream. This technique can lead to improved dispersion of the catalyst or prepolymer in the bed.

If desired, liquid or liquid-soluble additives, for example, activators, cocatalysts and the like, can be introduced into the bed together with the condensed liquid.

Where the polymer product is an ethylene homo- or copolymer, make-up ethylene, for example, to replace the ethylene consumed during the polymerisation, may be advantageously introduced into the separated gas stream prior to its reintroduction into the bed (for example below the fluidisation grid if such is employed). By adding the make-up ethylene to the separated gas stream rather than into the recycle gaseous stream before separation, the quantity of liquid which may be recovered from the separator may be increased and the productivity improved.

The separated liquid stream may be subjected to additional cooling (e.g. using refrigeration techniques) before being introduced into the fluidised bed. This allows an even greater cooling effect in the bed than is provided by the liquid evaporative effect (latent heat of evaporation) alone, thereby providing further potential increases in productivity of the process. Cooling of the separated liquid stream may be achieved by use of suitable cooling means e.g. a simple heat exchanger or refrigerator located between the separator and the reactor. By cooling the liquid before introduction into the fluidised bed, any tendency for catalyst or prepolymer which may be contained in the liquid stream to cause polymerisation before introduction into the bed will be reduced.

A preferred arrangement for introduction of the liquid to the fluidised bed is to provide a plurality of liquid injection means substantially equally spaced in the fluidised bed in the region of the introduction of the liquid. The number of liquid injection means used is that number which is required to provide sufficient penetration and dispersion of liquid at each liquid injection means to achieve good dispersion of liquid across the bed. A preferred number of liquid injection means is four.

Each of the liquid injection means may, if desired, be supplied with the separated liquid by means of a common conduit suitably arranged within the reactor. This can be provided, for example, by means of a conduit passing up through the centre of the reactor.

The liquid injection means are preferably arranged such that they protrude substantially vertically into the fluidised bed, but may be arranged such that they protrude from the walls of the reactor in a substantially horizontal direction.

The rate at which the liquid can be introduced into the bed depends primarily on the degree of cooling desired in the bed, and this in turn depends on the desired rate of production from the bed. The rates of production obtainable from commercial fluidised bed polymerisation processes for the polymerisation of olefins depend, inter alia on the activity of the catalysts employed, and on the kinetics of such catalysts. Thus, for example, when catalysts having very high activity are employed, and high production rates are desired, the rate of liquid addition will be high. Typical rates of liquid introduction may be, for example, in the range 0.25 to 4.9, preferably 0.3 to 4.9 cubic meters of liquid per cubic meter of bed material per hour, or even higher. For conventional Ziegler catalysts of the "superactive" type (i.e. those based on transition metal, magnesium halide and organometallic cocatalyst), the rate of liquid addition may be, for example, in the range 0.5 to 1.5 cubic meters of liquid per cubic meter of bed material per hour.

In the process of the present invention the weight ratio of liquid:total gas which may be introduced into the bed can be for example in the range 1:100 to 2:1, preferably in the range 5:100 to 85:100, most preferably in the range 6:100 to 25:100. By total gas is meant the gas which is returned to the reactor to fluidise the bed together with any gas used to assist in the operation of the liquid injection means, e.g. atomising gas. The atomising gas may suitably be an inert gas, for example, nitrogen but is preferably make-up ethylene.

By injecting the liquid into the fluidised bed in this way any catalyst which is present in the liquid may benefit from the localised cooling effect of the liquid penetration surrounding each liquid injection means which may avoid hot spots and consequent agglomeration.

Any other suitable injection means may be used provided the penetration and dispersion of the liquid into the bed from such means is sufficient to achieve a good dispersion of liquid across the bed.

The preferred injection means is a nozzle or a plurality of nozzles which include gas-induced atomising nozzles in which a gas is used to assist in the injection of the liquid, or liquid-only spray-type nozzles.

Suitable gas-induced atomising nozzles and liquid-only spray nozzles are as described in WO94/28032.

Other type of nozzles may also be suitable for use in the process according to the present invention, for example ultrasonic nozzles.

The liquid injection means are suitably nozzles which protrude into the bed through the reactor wall (or through, a supporting grid for the bed) and which carry one or more jet outlets to deliver the liquid to the bed.

It is important in the process of the present invention to achieve good dispersion and penetration of the liquid in the bed. Factors which are important in achieving good penetration and dispersion are the momentum and direction of the liquid entering the bed, the number of points of introduction of the liquid pet unit crossectional area of the bed, and the spatial arrangement of the points of introduction of the liquid.

It is preferred that the separated condensed liquid is introduced into the reactor as one or more jets of liquid alone, or one or more jets of liquid and gas, from one or more jet outlets, each jet having a horizontal momentum flux in the case of the liquid only jets of at least $100 \times 10^3$ Kg s$^{-1}$ m$^{-2}$xm s$^{-1}$ and in the case of the gas/liquid jets of $200 \times 10^3$ Kg $^{-1}$ m$^{-2}$xm s$^{-1}$ wherein the horizontal mementum flux is defined as the mass flow rate of liquid (kilogrammes per second) in the horizontal direction per unit crossectional area (square meters) of the jet outlet from which it emerges, multiplied by the horizontal component of the velocity (meters per second) of the jet.

Preferably the momentum flux of each of the liquid or liquid/gas jets is at least $250 \times 10^3$ and most preferably at least $300 \times 10^3$ Kg s$^{-1}$ m$^{-2}$xm s$^{-1}$. Particularly preferred is the use of a horizontal momentum flux in the range $300 \times 10^3$ to $500 \times 10^3$ Kg s$^{-1}$ m$^{-2}$xm s$^{-1}$. In the case that the liquid jet emerges from the jet outlet in a direction other than horizontal, the horizontal component of the velocity of the jet is calculated from Cosine Q°xactual jet velocity, wherein Q° is tie angle the jet makes with the horizontal.

The direction of motion of the one or more liquid/gas jets into the bed is preferably substantially horizontal. In the case that one or more of the jet outlets deliver the liquid/gas jets in a direction other than horizontal, preferably these are directed at an angle not greater than 45°, most preferably not more than 20° to the horizontal.

The one or more nozzles are suitably each equipped with one or more jet outlets. The number of nozzles, and the number and distribution of the jet outlets are important factors in obtaining good distribution of liquid within the bed. If a plurality of nozzles are employed, they are preferably vertically disposed and spaced horizontally and substantially equidistant from one another. In this case, they are also preferably spaced equidistant from one another and from the vertical wall of the fluidised bed. The number of nozzles per 10 square meters of the horizontal cross-sectional area of the bed is preferably in the range 1 to 4, most preferably in the range 2 to 3. Where the calculated number is not an integer, it is preferably rounded up to an integer. The number of jet outlets in each nozzle is preferably in the range 1 to 40 most preferably in the range 3 to 16. In the case that the nozzle contains more than one jet outlet, the jet outlets are preferably arranged circumferentially and equidistant from one another around the nozzle.

Each nozzle may be provided with a plurality of outlets of suitable configuration. The outlets may for example comprise circular holes, slots, ellipsoids or other suitable configurations. Each nozzle may comprise a plurality of outlets of varying configuration.

As indicated above, the jets of liquid may consist solely of liquid or may comprise a liquid/gas mixture. Such gas may be merely carried in the liquid, or may employed to atomise the liquid, or to provide motive force to propel the liquid.

Processes according to the present invention will now be illustrated with reference to the accompanying drawings.

Figure 2:
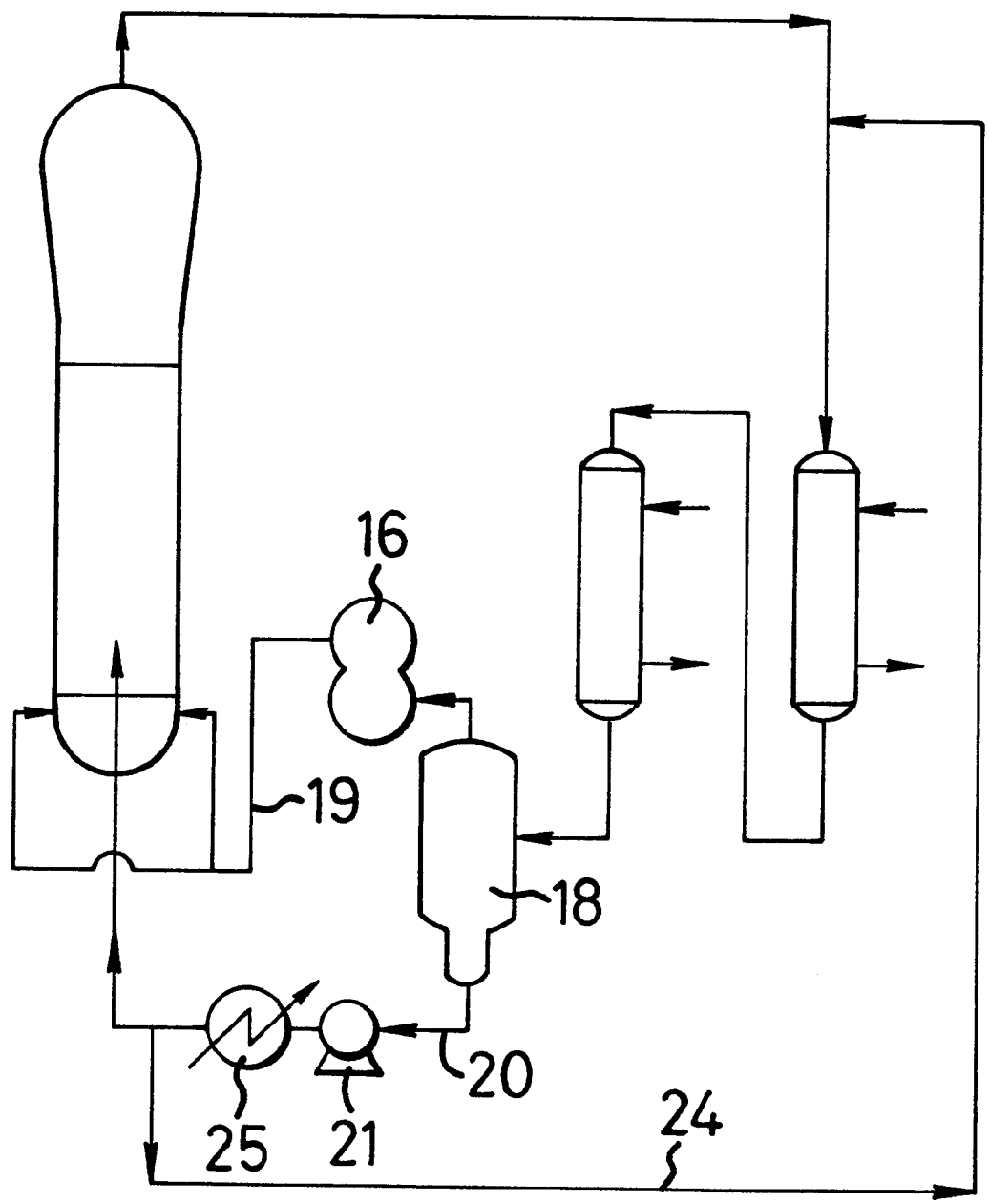
FIG. 2 shows diagrammatically an alternative arrangement of the reactor for use with the polymerization process of the invention.
Figure 3:
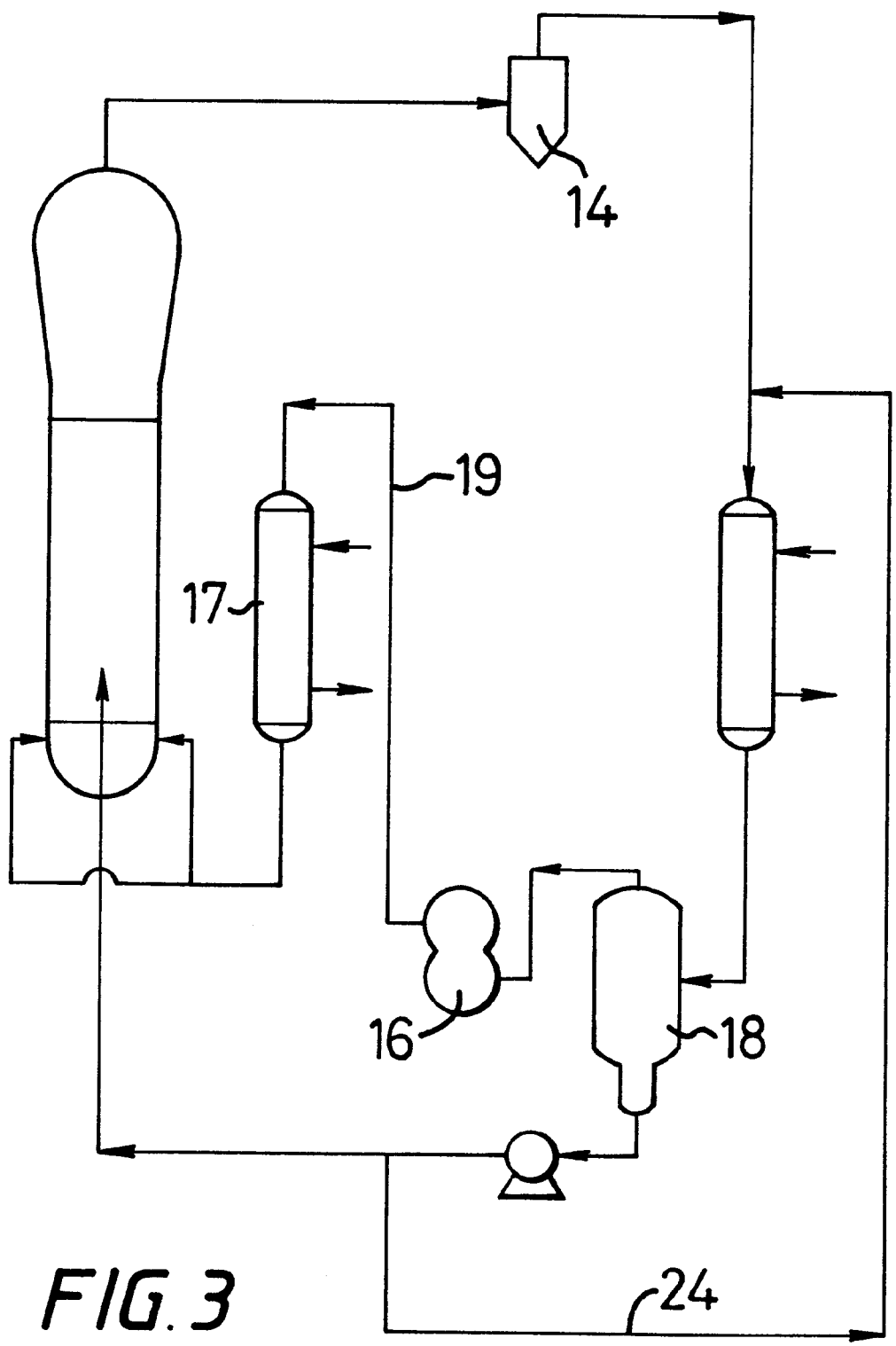
FIG. 3 shows diagrammatically yet a further arrangement of the reactor for use with the process of the invention.

FIGS. 1–3 show diagrammatically processes according to the present invention.

FIG. 1 illustrates a gas-phase fluidised bed reactor consisting essentially of a reactor body 9 which is generally an upright cylinder having a fluidisation grid 10 located in its base. The reactor body comprises a fluidised bed 11 and a velocity reduction zone 12 which is generally of increased cross-section compared to the fluidised bed.

The gaseous reaction mixture leaving the top of the fluidised bed reactor constitutes recycle gaseous stream and is passed via line 13 to a first heat exchanger 15 and a compressor 16. A second heat exchanger 17 is present to remove the heat of compression after the recycle gaseous stream has passed through the compressor 16 and also to cool the recycle stream to a temperature such that a condensate is formed.

A cyclone (14) is placed between the top of the reactor and the first heat exchanger (in line 13) in order to separate a major amount of fines; removed fines may then suitably be returned to the fluidised bed.

The heat exchanger or exchangers can be arranged either upstream or downstream of the compressor 16.

After compression and cooling to a temperature such that a condensate is formed, the resultant gas-liquid mixture is passed to the separator 18 where the liquid is removed.

The gas leaving the separator is recycled via line 19 to the bottom of the reactor 9. The gas is passed via the fluidisation grid 10 to the bed thereby ensuring that the bed is maintained in a fluidised condition.

The separated liquid from the separator 18 is passed via line 20 to the reactor 9. A pump 21 is suitably located in line 20. Part of this separated liquid is passed via line 24 and reintroduced in the recycle gaseous stream (line 13) before its introduction in the second heat exchanger.

Catalyst or prepolymer are fed to the reactor via line 22 into the separated liquid stream.

Product polymer particles are removed from the reactor via line 23.

FIG. 2 illustrates an alternative arrangement for performing the process of the present invention. In this arrangement the compressor 16 is located in line 19 after separation of the recycle gaseous stream by the separator 18. This has the advantage that the compressor has a reduced quantity of gas to compress and can therefore be of reduced size achieving a better process optimisation and cost. An additional cooling device (25) for the condensed liquid is suitably located in line (20) after pump (21).

The arrangement shown in FIG. 2 is particularly suitable for use when retrofitting existing gas phase polymerisation reactors using fluidised bed processes.

FIG. 3 illustrates a further arrangement for performing the process of the present invention whereby the compressor 16 is again arranged in line 19 after the separator 18 but before the second heat exchanger 17 which is located in the separated gas stream rather than located before the separator. Again this arrangement gives a better process optimisation. An optional cyclone has been added in line 13.

We claim:

1. A continuous gas fluidized bed process for the polymerization of an olefin monomer selected from the group consisting of (a) ethylene, (b) propylene, (c) mixtures of ethylene and propylene, and (d) mixtures of (a), (b), or (c) with one or more other alpha-olefins to produce a polymer in a fluidized bed reactor, which process comprises the steps of:

(a) continuously withdrawing from a fluidized bed reactor a gaseous stream comprising unreacted olefin monomer and having entrained therein at least one of catalyst or polymer particles;

(b) continuously recycling said gaseous stream comprising unreacted olefin monomer through a fluidized bed in said reactor in the presence of a polymerization catalyst under reactive conditions;

(c) cooling by means of at least one heat exchanger at least part of said gaseous stream withdrawn from said reactor to a temperature at which liquid condenses out of the stream;

(d) separating at least part of the condensed liquid from the gaseous stream; and (e) introducing at least part of the separated liquid directly into the fluidized bed, wherein at least part of the separated liquid is reintroduced into the recycle gaseous stream before said at least one heat exchanger.

2. The process of claim 1 wherein the separated liquid is introduced into the fluidized bed at or above the point at which the gaseous stream passing through the fluidized bed has substantially reached the temperature of the gaseous stream being withdrawn from the reactor.

3. The process of claim 1 wherein the separated liquid is introduced into the reactor as one or more jets of liquid alone, or one or more jets of liquid and gas, from one or more jet outlets, each jet having a horizontal momentum flux in the case of the liquid only jets of at least $100 \times 10^3$ Kg s$^{-1}$ m$^{-2}$×m s$^{-1}$ and in the case of the liquid and gas jets of $200 \times 10^3$ Kg s$^{-1}$ m$^{-2}$×m s$^{-1}$, wherein the horizontal momentum flux is defined as the mass flow rate of liquid in kilograms per second in the horizontal direction per unit cross-sectional area in square meters of the jet outlet from which it emerges, multiplied by the horizontal component of the velocity in meters per second of the jet.

* * * * *